US012464436B2

(12) United States Patent
Mao et al.

(10) Patent No.: US 12,464,436 B2
(45) Date of Patent: Nov. 4, 2025

(54) METHOD OF REDUCING ADVERTISED RF BAND

(71) Applicant: GOOGLE LLC, Mountain View, CA (US)

(72) Inventors: Rukun Mao, Mountain View, CA (US); Qin Zhang, Mountain View, CA (US); Shivank Nayak, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 381 days.

(21) Appl. No.: 18/012,223

(22) PCT Filed: Jun. 26, 2020

(86) PCT No.: PCT/US2020/039875
§ 371 (c)(1),
(2) Date: Dec. 21, 2022

(87) PCT Pub. No.: WO2021/262194
PCT Pub. Date: Dec. 30, 2021

(65) Prior Publication Data
US 2023/0276350 A1    Aug. 31, 2023

(51) Int. Cl.
*H04W 48/12* (2009.01)
(52) U.S. Cl.
CPC .................. *H04W 48/12* (2013.01)
(58) Field of Classification Search
CPC ..... H04W 48/12; H04W 24/02; H04W 48/16; H04W 48/18; H04W 64/00; H04W 8/24
See application file for complete search history.

(56) References Cited

U.S. PATENT DOCUMENTS 10,362,527 B2 *   7/2019   Carames ............... H04W 48/02
2015/0341846 A1   11/2015   Shi et al.
(Continued)

FOREIGN PATENT DOCUMENTS

WO   WO-2019/216908 A1   11/2019
WO   WO-2019/231384 A1   12/2019

OTHER PUBLICATIONS

International Search Report and Written Opinion for Application No. PCT/US2020/039875, dated Mar. 1, 2021.
(Continued)

*Primary Examiner* — Diane D Mizrahi
(74) *Attorney, Agent, or Firm* — MARSHALL, GERSTEIN & BORUN LLP (57) ABSTRACT

A User Equipment (UE) (102) supports a plurality of RF bands (132) associated with a plurality of country codes. The UE (102) reduces the entirety of the set of UE-supported RF bands (132) based on a current, physical location (115) of the UE (102), and the UE (102) advertises only the reduced set of UE-supported RF bands to a network or wireless communication system (100), e.g., for attachment purposes. For example, the UE (102) may reduce the entirety of the set of RF bands that it supports (132) based on a country code provided by a base station (105, 108) of a network (100) and the physical location (115) of the UE (102), thereby generating a reduced set of UE-supported RF bands. Subsequently, the UE (102) may advertise only the reduced set of RF bands supported by the UE (102), and refrain from advertising one or more RF bands excluded from the reduced set, e.g., by omitting any indication of the excluded RF bands from advertisements.

20 Claims, 3 Drawing Sheets

(56) References Cited

U.S. PATENT DOCUMENTS

| | | |
|---|---|---|
| 2016/0255467 A1 | 9/2016 | Xue et al. |
| 2017/0367073 A1 | 12/2017 | Murugan et al. |
| 2019/0090289 A1 | 3/2019 | Huang-Fu et al. |
| 2019/0281604 A1 | 9/2019 | Kim et al. |
| 2019/0373540 A1 | 12/2019 | Zaus et al. |
| 2020/0107291 A1 | 4/2020 | Nayak et al. |
| 2020/0351858 A1 | 11/2020 | Tsai et al. |

OTHER PUBLICATIONS

"3rd Generation Partnership Project; Technical Specification Group Radio Access Network; Evolved Universal Terrestrial Radio Access (E-YTRA); Radio Resource Control (RRC); Protocol Specification (Relase 16)," 3GPP Standard (2020).

"3rd Generation Partnership Project; Technical Specification Group Radio Access Network; Evolved Universal Terrestrail Radio Access (E-UTRA); User Equipment (UE) Radio Access Capabilities (Relase 16)," 3GPP Standard (2020).

Office Action for European Application No. 20740474.0, dated Jul. 17, 2025.

\* cited by examiner

METHOD OF REDUCING ADVERTISED RF BAND

CROSS-REFERENCE TO RELATED APPLICATIONS

This patent application is a national stage application, filed under 35 U.S.C. § 371, of International Application No. PCT/US2020/039875, filed Jun. 26, 2020 and entitled "METHOD OF REDUCING ADVERTISED RF BAND," the disclosure of which is incorporated by reference herein in its entirety.

FIELD OF THE DISCLOSURE

This disclosure relates to wireless communications and, more particularly, to allocating resources for wireless communications, e.g., in an unlicensed portion of the spectrum.

BACKGROUND

The background description provided within this document is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

While attempting to attach or connect to a wireless communication system, a User Equipment (UE) transmits a User Equipment Capability Information Element message (e.g., a UE Capability IE) which includes, among other information, indications of portions of radio frequency (RF) spectrum or bands that the UE is capable of utilizing for wireless communications. That is, in the UE Capability IE, the UE advertises the set of RF bands that the UE processing hardware supports, which may include various RF bands that are utilized in different geographical locations, in different jurisdictions, by different carriers, and the like.

Accordingly, the UE's advertisement of all potentially relevant RF bands that the UE supports may needlessly consume resources, such as wireless bandwidth and the overall time needed to complete an attachment of the UE with the system. Furthermore, certain cells or base stations may not be able to process UE-generated messages over a particular size, and thus may reject the attempt of the UE to attach to the system when advertisements are needlessly large, therefore further delaying the attachment of the UE to the system.

SUMMARY

The UE reduces an entirety of a set of RF bands that the UE supports based on a physical location of the UE, and the UE advertises only the reduced set of UE-supported RF bands to a network or wireless communication system, e.g., for attachment purposes. For example, the UE may reduce the entirety of the set of RF bands that it supports based on a country code provided by a base station of a network and the physical location of the UE, thereby generating a reduced set of UE-supported RF bands. Subsequently, the UE may transmit an advertisement of only the reduced set of RF bands supported by the UE. That is, the UE may refrain from advertising RF bands excluded from the reduced set, e.g., by omitting any indication of the excluded RF bands from the advertisement.

These techniques provide significant advantages to the current practice of the UE indicating or advertising an entirety of the set of RF bands supported by the UE. By omitting advertisements of one or more RF bands that are associated with the physical location of the UE and not utilized or supported by the wireless communication system at that location, the size of the advertisement is greatly reduced, thereby freeing up wireless communication resources and reducing the overall time needed for the UE to attach to the system.

In an example embodiment, a User Equipment that is configured to support a plurality of RF bands performs a method of advertising a reduced set of UE-supported RF bands, e.g., a method of advertising a subset of the entirety of the plurality of UE-supported RF bands. The method includes receiving, at processing hardware of the UE from a base station of a network, a country code with which the network is associated, and obtaining an indication of a physical location of the UE. Additionally, the method includes reducing, by the processing hardware, the set of UE-supported RF bands based on the received country code and the physical location of the UE to generate a reduced set of UE-supported RF bands. The method further includes transmitting, by the processing hardware of the UE, an advertisement of only the reduced set of RF bands supported by the UE. That is, the UE does not advertise any UE-supported RF bands that are not included in the reduced set.

DETAILED DESCRIPTION

Figure 1:
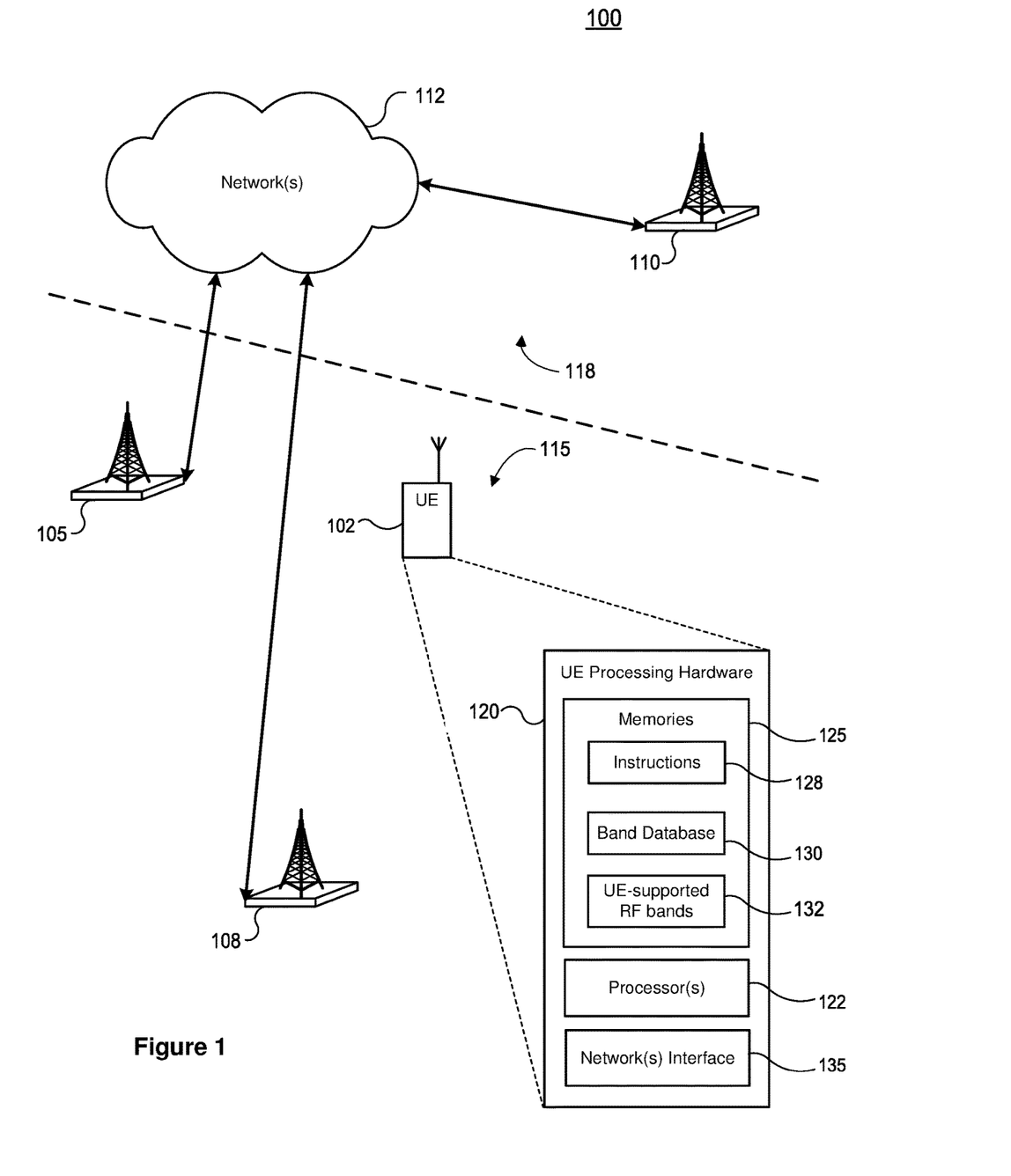
FIG. 1 depicts an example wireless communication system in which base stations and user devices communicate in accordance with one or more techniques for reducing the set of radio frequency bands advertised by a user device or user equipment (UE) described in this document.

FIG. 1 depicts an example wireless communication system 100 in which base stations and user devices (also referred within this disclosure as user equipment, or UEs) communicate using various portions of radio spectrum or radio frequency (RF) bands. The wireless communication system 100 includes a UE 102, which can be any suitable device capable of wireless communications (as further discussed below). As shown in FIG. 1, the wireless communication system 100 further includes one or more base stations 105, 108, 110 connected to one or more networks 112. The one or more networks 112 are depicted in FIG. 1 as being an integral network for ease of illustration and not limitation purposes; however, each base station 105, 108, 110 may be directly connected to the same or different networks (such as core networks and/or other types of back-end carrier networks), and the different networks may be communicatively connected, e.g., via any number of public networks, private networks, and/or the Internet. As depicted in FIG. 1, base stations 105 and 108 are physically located within a first area 115, which may be, for example, a country, a region, a city, a zone, or some other type of delineated and/or designated geographical area. Base station 110 is physically located within a second area 118, which may be, for example, another country, region, city, zone, or delineated and/or geographical area. Areas 115 and 118 may be distinguished by different identifiers, such as country codes, region codes or identifiers, and the like. In arrangements of the network 100 (not shown in FIG. 1), each area 115, 118 may be subdivided into smaller geographical areas, each smaller geographical area may be subdivided into still smaller geographical areas, and so on. For example, a particular physical location may be associated with a respective country, region, city, and zone, each of which may have a unique identifier. Delineations of different types and/or locations of various sizes of geographical areas may be jurisdictionally-based and/or carrier-based, for example.

The UE 102 may be a subscriber of one or more carriers or service providers that operate the base stations 105, 108, 110 and corresponding back-end networks 112, and thus the UE 102 is able to communicate with the base stations 105, 108, 110. The UE 102 is equipped with processing hardware 120 that can include one or more general-purpose processors 122 (e.g., CPUs) and one or more non-transitory computer-readable memories 125 storing instructions 128 that the one or more general-purpose processors 122 execute. In an example, the one or more processors 122 execute the instructions 128 to perform one or more techniques for advertising, e.g., to a network 112, a reduced set of RF bands that are supported by the UE 102 described within this document. Additionally or alternatively, the processing hardware 120 can include special-purpose processing units.

As shown in FIG. 1, the one or more memories 125 of the UE 102 store an instance of a band database 130. The band database 130 stores information that indicates, for various criteria (such as country and/or other jurisdictional entity, country and/or other jurisdictional regulations and/or allocations, carrier, carrier constraints and/or requirements, etc., or combinations thereof), the RF bands that are available for use. Generally speaking, different RF bands correspond to different frequency ranges, and may be referred to alphanumerically. Each band may support one or more wireless communication technologies. For example, Band 2 (1900 MHZ) may support 2G, 3G, and 4G LTE technologies, Band 4 (1700/2100 MHz) may support 3G and 4G LTE technologies, Band 71 (600 MHz) may support 4G LTE and 5G technologies, Band n41 (2.5 GHZ) may support 3G, 4G LTE, and 5G technologies, Bands N260 (39 GHz) and N261 (28 GHz) may support 5G mmWave technologies, etc. Some bands may be available for licensed use, and some bands may be available for unlicensed use in various jurisdictions, such as the 900 MHZ, 2.4 GHz, and 5.8 GHz bands in the United States.

In FIG. 1, the instance 130 of the band database is stored at the UE 102, and the contents of the instance 130 of the band database may be updated to reflect any changes, e.g., via Over-the Air programming (OTA) or some other suitable technique. For example, if a carrier needs to disable a particular RF band in a particular location for some duration of time, the carrier may push a corresponding update of the band database to UEs for which the carrier provides communication services. Additionally or alternatively, UEs may request or pull updates from carriers. As such, another instance of the band database (e.g., a remote, master instance of the band database) may be stored on another computing device, server, and/or network. The UE 102 may obtain (e.g., via push and/or via pull) any updates that have been made to the remote, master instance of the band database and apply the updates to the local instance 130 of the band database. In some embodiments, the UE 102 may directly access and/or request information stored in the remote instance of the band database, e.g., via a query.

As illustrated in FIG. 1, the processing hardware 120 of the UE 102 includes one or more network interfaces 135, which are configured to collectively support the UE 102 wirelessly communicating over a set of Radio Frequency (RF) bands or portions of RF spectrum. Different interfaces 135 may support communications over different RF bands. For example, the network interfaces 135 may support the UE 102 communicating over designated cellular RF bands, unlicensed spectrum, Wi-Fi, Bluetooth or other short-range wireless protocols, and the like. For wireless technologies that utilize core networks (e.g., 4G LTE, 5G, 6G, etc.), corresponding network interfaces 135 may allow the UE 102 to communicate with the back-end network 112 via corresponding RF bands. The UE 102 maintains a list or data store 132 whose contents indicate the RF bands over which the UE 102 is able to (e.g., is configured to) communicate, also referred to in this document as a list 132 of the set of "UE-supported RF bands." Of course, although not shown in FIG. 1, the memories 125 of the UE 102 may store other instructions and/or other data.

Figure 2:
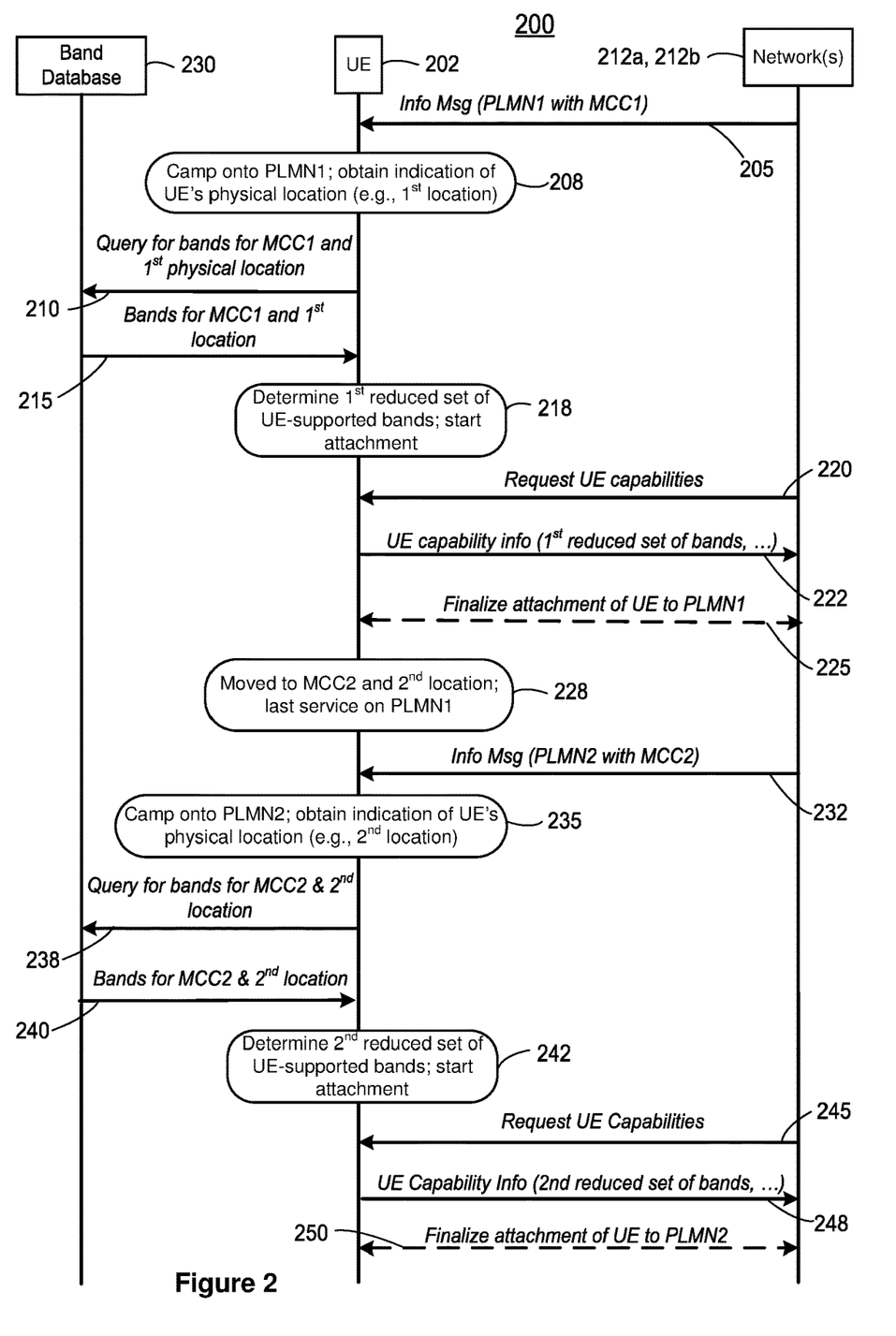
FIG. 2 depicts an example message flow corresponding to advertising a reduced set of RF bands supported by a UE.

FIG. 2 depicts an example message flow 200 which may occur in the system 100 or in other wireless communication systems. In an embodiment, one or more components of the wireless communication system 100 of FIG. 1 may perform at least a portion of the message flow 200. For example, the UE 202 shown in FIG. 2 may be the UE 102 of FIG. 1, the band database 230 may be the band database 130, and each of the networks 212a, 212b may be a respective one of the networks 112. Additionally or alternatively, one or more other components of the wireless system 100 may perform at least a portion of the message flow 200. However, for ease of illustration, and not limitation purposes, this document discusses the message flow 200 with simultaneous reference to FIG. 1. Moreover, in embodiments, the message flow 200 may include additional, less, or alternate messaging and/or functionality than that discussed with respect to FIG. 2, including messaging and/or functionality discussed elsewhere in this document.

In the example scenario corresponding to FIG. 2, a UE 202 moves within range of a base station (not shown) that is connected to a network 212a which, in embodiments, may include a core network. Via the base station, the network 212a broadcasts and the UE 202 receives an information message 205 indicating the identity of the network 212a (e.g., an identification of a Public Land Mobile Network, PLMN code, or other suitable identifier), a country code indicative of the country in which the base station is physically located (e.g., a mobile country code (MCC) or similar). In some embodiments, the information message 205 may also include an indication of a carrier code which identifies a carrier, service provider, or network operator associated with the broadcast message 205 (e.g., a mobile network code (MNC) or similar), and optionally other geographical-related indicia, such as base station or cell ID, sector ID, global positioning and/or geo-spatial coordinates of the base station and/or of its components (e.g., antenna, transceiver, etc.). In some embodiments, the information message 205 may include an indication of a set of RF bands that are supported by the base station. In an example implementation, the information message 205 may include a Master Information Block (MIB) and/or one or more System Information Blocks (SIBs) specifying the PLMN, MCC, and other information. Further, although the information message 205 is depicted in FIG. 1 as being a single message or broadcast transmission, in implementations the information message 205 may include multiple messages or broadcast transmissions. In the example message flow 200, the information message 205 identifies the PLMN of the network 212a as PLMN1 and identifies the country code as MCC1.

Upon reception of the broadcasted information message 205, the UE 202 camps onto the network PLMN1 via the base station (or via another, more suitable base station, e.g., based on measurements performed by the UE 202) in preparation for attaching to the network 212a, and the UE 202 obtains additional information indicative of the current physical location of the UE 202 (reference 208). In an example, the UE 202 obtains information indicative of its physical location via one or more components of the UE 202, such as an on-board altimeter, satellite-based radio navigation component (e.g., GPS or other type of global positioning and/or geo-spatial positioning device), accelerometer, proximity sensor, barometer, and/or other types of on-board sensors. In some embodiments, the UE 202 additionally or alternatively obtains information indicative of its physical location from other devices. For example, the UE 202 may derive or determine its physical location based on the UE 202 detecting, via one or more transceivers, the presence of broadcast and/or beacon transmissions from other RF transmitters, devices, and/or base stations (e.g., transmissions generated by the base station, by another base station, by shorter range RF transmitters such as Wi-Fi and Bluetooth transmitters, etc.). Further, the UE 202 may derive or determine its physical location based on the information included in the detected broadcast and/or beacon transmissions, such as cell ID, sector ID, local network identifier, location of the broadcast/beacon transmitter, etc. The information indicative of the physical location of the UE 202 may include absolute positioning information (e.g., the latitude, longitude, and altitude of the physical location of the UE 202) and/or relative positioning information (e.g., with respect to a RF transmitter whose broadcast/beacon transmission was received at the UE 202). In some implementations, the UE 202 derives the information indicative of its physical location from received data and/or information.

In the example message flow 200, the UE 202 queries the band database 230 for bands that are available for use for the given country code (e.g., MCC1) and the current physical location of the UE 202 (reference 210). As previously discussed, the band database 230 may be stored at the UE 202 or at another device or network. The UE 202 may optionally provide other criteria to further limit the query, such as the identity of the carrier or network service provider associated with the base station. In a response 215, the band database 230 provides an indication of the available RF bands that meet the criteria specified by the UE 202 in the query 210, which typically is a subset of the entirety of the set of RF bands identified within band database 230. For example, the band database 230 may filter its contents to determine one or more RF bands that are available for use in the country indicated by the country code and at the physical location of the UE 202, or the band database 230 may find entries that match the country code and the physical location of the UE 202. In embodiments in which the band database 230 is stored at the UE 202, the UE 202 may perform the matching and/or the filtering of the contents of the band database 230 to determine one or more RF bands that are available for use in the country indicated by the country code and at the physical location of the UE 202.

Based on the response 215 of the band database 230, the UE 202 may determine a reduced set of RF bands that the UE 202 supports (block 218) and which the UE 202 will advertise to the network 212. That is, the UE 202 determines a subset of the entirety of the set of RF bands that the UE 202 supports, e.g., a subset of the entirety of the UE-supported RF bands indicated in stored data 132. For example, the UE 202 may determine the reduced set of UE-supported RF bands to include one or more RF bands included in an intersection of the entirety of the set of UE-supported RF bands 132 and the available RF bands indicated by the band database 230 via response 215.

In some embodiments, the UE 202 may determine the reduced set of UE-supported RF bands further based on one or more other criteria. For example, the UE 202 may determine the reduced set of UE-supported RF bands to include one or more RF bands included in an intersection of the entirety of the set of UE-supported RF bands 132, the available RF bands indicated by the band database 230 via response 215, and a set of RF bands that meet the one or more other criteria such as, for example, inclusion in a set of base station-supported RF bands, allocated for use by the carrier or network service provider of the base station, availability at the geographical coordinates associated with the UE 202 and/or the base station, etc. For example, the intersection may include one or more RF bands that are allocated for use by the carrier or network provider of the base station, and that are at an altitude and/or attitude corresponding to the physical location of the UE 202, e.g., a 5G band, a mmWave band, etc. The reduced set of UE-supported RF bands may include one or more RF bands; however a total number of members of the reduced set of UE-supported RF bands is less than the total number of members of the set of UE-supported RF bands 132. The UE 202 maintains a record of the reduced set, and begins the attachment procedure with the network 212a (reference 218).

As part of the attachment procedure, the network 212a requests the UE 202 to provide an indication of the UE's capabilities (reference 220). For example, the network 212a may send a UECapabilityEnquiry message or similar to the UE 202. The UE 202 may respond with a message that indicates the UE's capabilities (reference 222), where the message 222 includes an advertisement or indication of the reduced set of RF bands that the UE 202 supports, as well as indications of other capabilities of the UE 202, such as features, feature groups, measurements, inter-RAT (Radio Access Technology) capabilities, proximity detection, and/or other types of capabilities. Significantly, the message 222 omits advertising any UE-supported RF band which is not included in the reduced set of UE-supported RF bands. Subsequently, the UE 202 and the network 212a may finalize and complete the attachment of the UE 202 to the network 212a (reference 225) in accordance with the UE's advertised capabilities 222.

Continuing further with the message flow 200, at some time after the UE 202 has attached to the network 212a or PLMN1, the UE 202 moves to a second physical location which is in another country that is identified by its corresponding country code MCC2 (reference 228). (The UE 202 may or may not have detached or disconnected from the network 212a or PLMN1 prior to the UE 202 moving to the second location.) The second physical location of the UE 202 is within range of another base station connected to a different network 212b, e.g., a "second" base station of a "second" network 212b. Accordingly, the UE 202 receives, via a broadcast transmission of the network 212b via the second base station, an information message 232 indicating the identity of the network 212b and a country code indicative of the country in which the second base station is physically located. In some embodiments, the information message 232 also includes a carrier code indicative of the carrier, service provider, or network operator associated with the broadcast information message 232, and optionally other geographical-related indicia and/or related information corresponding to the base station and/or network 212b, similar to that described above with respect to the network 212a. In some embodiments, the information message 205 may include an indication of a set of RF bands that are supported by the second base station. In the example illustrated in FIG. 2, the information message 230 identifies the PLMN of the network 212b as PLMN2 and identifies the country code as MCC2.

Upon reception of the broadcast information message 232, the UE 202 camps onto the network PLMN2 via the second base station in preparation for attaching to the network 212b or PLMN2, and obtains additional information indicative of the current, second physical location of the UE 202 (reference 235), e.g., in a manner similar to that discussed above with respect to the UE 202 and the network 212a or PLMN1.

Additionally, the UE 202 queries the band database 230 (reference 238) for RF bands that are available for the given country code (e.g., MCC2) and the second physical location of the UE 202, e.g., in a manner similar to that discussed above with respect to reference 210. Based on the response 240 of the band database 230, the UE 202 may determine a second reduced set of RF bands that the UE 202 supports (reference 242). That is, the UE 202 may determine another, second subset of the entirety of the set of RF bands that the UE 202 supports (e.g., a subset of the entirety of the UE-supported RF bands indicated in the stored data 132) based on the response 240, so that the RF bands included in the second subset correspond to the given country code and the second physical location of the UE 202. For example, the UE 202 may determine the second reduced set of UE-supported RF bands to include one or more RF bands included in an intersection of the entirety of the set of UE-supported RF bands 132 and the available RF bands indicated by the band database via response 240, and optionally based on one or more other criteria, such as, for example, inclusion in a set of base station-supported RF bands, allocated for use by the carrier or network service provider of the base station, availability at the geographical coordinates associated with the UE 202 and/or the base station, etc. The second reduced set of RF bands may include one or more RF bands; however a total number of members of the second reduced set of UE-supported RF bands is less than the total number of members of the set of UE-supported RF bands 132. The UE 202 maintains a record of the second reduced set, and begins the attachment procedure with the network 212b (reference 242).

As part of the attachment procedure, the network 212b requests the UE 202 to return an indication of the UE's capabilities (reference 245). For example, the network 212b may send a UECapabilityEnquiry message or similar to the UE 202. The UE 202 may respond with a message that indicates the UE's capabilities (reference 248), where the message 248 includes an advertisement or indication of the second reduced set of bands that the UE 202 supports, as well as indications of other capabilities of the UE 202, such as features, feature groups, measurements, inter-RAT (Radio Access Technology) capabilities, proximity detection, and/or other types of capabilities. Significantly, the message 248 omits advertising any UE-supported RF band which is not included in the second reduced set of UE-supported RF bands. Subsequently, the UE 202 and the network 212b may finalize and complete the attachment of the UE 202 to the network 212b (reference 250) in accordance with the UE's advertised capabilities 248.

Figure 3:
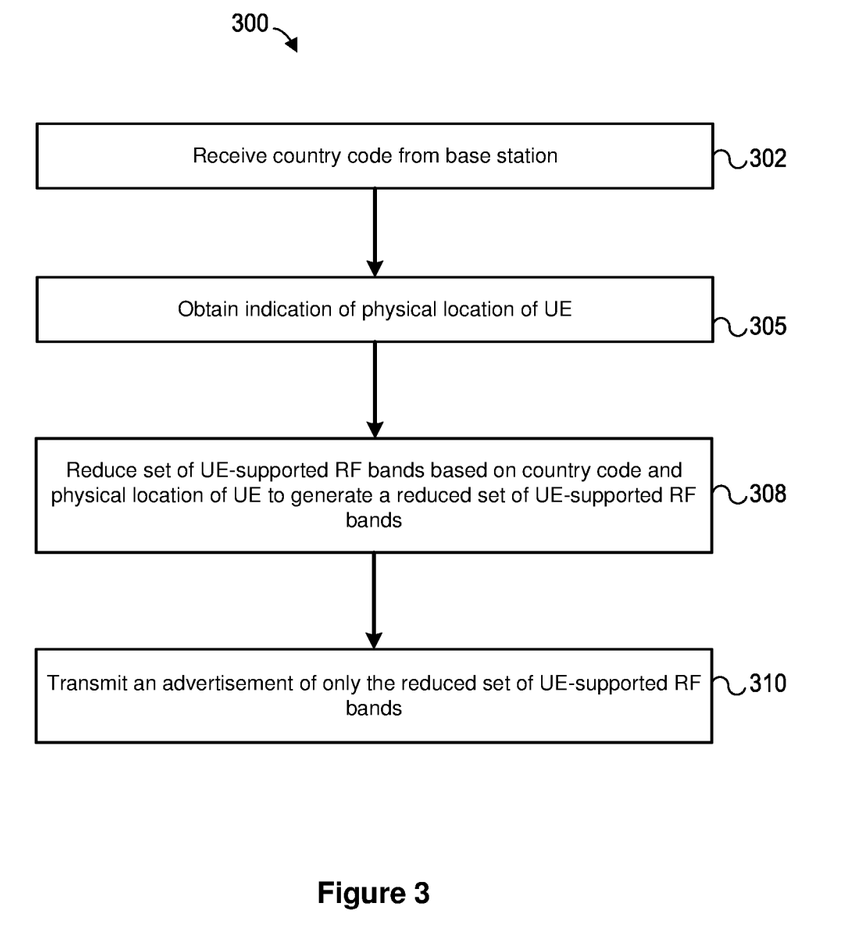
FIG. 3 is a flow diagram of an example method of advertising a reduced set of RF bands supported by a UE.

FIG. 3 is a flow diagram of an example method 300 for advertising a reduced set of RF bands, where the reduced set is a subset of an entirety of a set of RF bands supported by a UE. In an embodiment, the UE 102 may perform at least a portion of the method 300, e.g., one or more components of the UE 102 (such as the instructions 128, the network interfaces 135, etc.) may perform at least a portion of the method 300. In an embodiment, at least a portion of the method 300 may execute in conjunction with the message flow 200 of FIG. 2. For example, the UE 202 may perform at least a portion of the method 300. Further, the method 300 may include more, less, or alternative steps than those described within this document, in embodiments. For ease of discussion, and not for limitation purposes, this document describes the method 300 with simultaneous reference to FIGS. 1 and 2.

At a block 302, the method 300 includes receiving, at processing hardware of the UE from a base station of a network, a country code with which the network is associated. The processing hardware of the UE may receive the country code via one or more transmissions that have been broadcast by the base station, for example, and the country code may be a mobile country code (MCC) or other suitable indication of the country in which the base station is physically located. In some embodiments, the processing hardware of the UE also receives other information from the base station in conjunction with the country code, such as the identity of the carrier or network service provider, identity of the base station and/or sector, global positioning and/or geo-spatial coordinates associated with base station, other types of geographical information associated with the base station, an indication of a set of RF bands that are utilized by the base station, etc.

At a block 305, the method 300 includes obtaining, by the processing hardware of the UE, an indication of a physical location of the UE. The processing hardware of the UE may obtain the indication of a current physical location of the UE based on information provided by one or more components that are included in the UE. For example, the processing hardware may obtain such location information based on conditions sensed by one or more on-board sensing devices (e.g., positioning sensors and/or other types of sensors), and/or may obtain such information from the presence and/or contents of transmissions and/or messages that the UE processing hardware receives via one or more wireless transceivers (e.g., information messages, beacons, broadcasts, etc. that have been generated by other devices and/or systems. Location information may include, for example, geographical and/or geo-spatial coordinates (e.g., latitude, longitude, altitude, attitude, etc.) of the UE, of the base station or other devices/systems, of base station components (such as an antenna, a transceiver, etc.). The geographical and/or geo-spatial coordinates may include absolute or relative coordinates, for instance. In some embodiments, the UE may derive its location information based on data received from on-board components and/or other devices or systems.

At a block 308, the method 300 includes reducing, by the processing hardware of the UE, an entirety of a set of UE-supported RF bands (e.g., of the set of UE-supported RF bands indicated by data store 132) based on the country code and the physical location of the UE to generate a reduced set of UE-supported RF bands. The reduced set of UE-supported RF bands may include any type of RF bands that are supported by the UE (e.g., bands utilized by 3G, 4G, 4G LTE, 4G, and/or 6G technologies, unlicensed spectrum bands, mmWave or other bands supporting shorter wavelength and highly-focused transmissions, etc.) that correspond to the country code and the physical location of the UE. Generally speaking the reduced set is a subset of the entirety of the set of RF bands which the UE is capable of supporting.

Reducing the set of UE-supported RF bands 308 may include, in embodiments, determining the reduced set of UE-supported RF bands to include a subset of the entirety of the set of UE-supported RF bands as indicated in the list or data store 132, where the RF bands included in the subset correspond to the country code and the physical location of the UE. For example, determining the subset of the set of UE-supported RF bands may include filtering the list 132 based on the country code and the physical location of the UE to determine the subset, and/or matching the country code and the physical location of the UE to one or more entries of the list 132 to determine the subset. Generally speaking, the reduced set of UE-supported RF bands may include or consist of one or more RF bands included in an intersection of the subset and the entirety of the list 132 of UE-supported RF bands.

Additionally or alternatively, reducing the set of UE-supported RF bands 308 may include accessing, by the processing hardware of the UE, a band database such as the band database 130, 230, or other band database, where the band database includes indications of the RF bands are respectively available for various country codes and optionally other criteria. Generally speaking, contents of the band database are made available to a plurality of UEs, and accessing the band database may include accessing an instance of the band database locally stored at the UE, and/or accessing an instance of the band database remotely stored at another device or system. As such, accessing the band database may include transmitting a query to the device(s) on which the band database is stored, or may include accessing the contents of the band database via some other suitable mechanism, such as a database access function, API, etc. At any rate, the UE may access the band database to thereby determine or obtain a list of RF bands that are available for the given country code and optionally, the physical location of the UE. In embodiments, contents of the band database may be filtered based on the given country code and/or physical location of the UE, and/or the given country code and/or physical location of the UE may be matched to various entries of the band database.

In some embodiments, reducing the set of UE-supported RF bands 308 includes both determining the subset of the set of UE-supported RF bands indicated by the list or data store 132 and accessing the band database. In these embodiments, reducing the set of UE-supported RF bands 308 to generate the reduced set of UE-supported RF bands may include determining the reduced set to include one or more RF bands included in an intersection of the subset of UE-supported RF bands and the available set of RF bands corresponding to the country code and optionally the physical location of the UE.

In some embodiments, reducing the set of UE-supported RF bands 308 may be further based on one or more criteria other than country code and current UE physical location. For example, the reduced set of UE-supported RF bands may be determined based on a carrier or network provider identifier, and/or other identifiers of components of the base station and/or the network. Additionally or alternatively, reducing the set of UE-supported RF bands 308 may be further based on other, narrower jurisdictional and/or carrier-based geographical segmentations or designations corresponding to the physical location of the UE and/or of the base station, such as a region, a state, a province, a city, a zone, and the like. As previously discussed, the UE may obtain and/or derive any of one or more other criteria based on input from one or more components of the UE, base station transmissions, and/or other sources (e.g., other base stations, other UEs, back-end systems, other devices and/or systems, etc.).

At a block 310, the method 300 includes transmitting, by the processing hardware of the UE, an advertisement of only the reduced set of UE-supported RF bands. For example, the processing hardware may transmit a message indicating or advertising its capabilities, such as a UECapabilityInfo message or similar. Importantly, within the transmitted message or advertisement, the UE advertises only the reduced set of UE-supported RF bands, and does not advertise any UE-supported RF bands that are excluded from the reduced set. By omitting advertisements of one or more RF bands that are associated with the physical location of the UE and not utilized or supported by the wireless communication system at that location, the techniques discussed within this document provide significant advantages over currently known techniques.

For example, currently known techniques in which the UE advertises all RF bands that it supports results in the UE advertising bands that are unutilized, unsupported, or not deployed by the wireless communication system at various physical locations within a given country. Advertising unutilized RF bands is not only moot, but also wastes resources that are utilized to attach the UE to the system. For example, the advertising of unsupported RF bands within a UE Capability message (or similar) results in a needless increase in wireless network traffic and utilized RF bandwidth, as well as in a needless increase in the overall time needed to complete the attachment of the UE with the system, at least because the system must process the moot advertisements. Additionally, certain cells or base stations may not be able to process UE Capability messages over a particular size, and thus may reject the attempt of the UE to attach to the system when UE Capability messages are needlessly large, therefore further delaying the attachment of the UE to the system.

On the other hand, by utilizing one or more of the techniques for advertising only a reduced set of UE-supported RF bands, the size of the advertisement is greatly reduced, thereby freeing up wireless communication resources and reducing the overall time needed for the UE to attach to the system.

The following additional considerations apply to the foregoing discussion.

A user device or User Equipment (UE) in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code stored on non-transitory machine-readable medium) or hardware modules. A hardware module is a tangible unit capable of performing certain operations and may be configured or arranged in a certain manner. A hardware module can include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional alternative structural and functional designs for enhancing Listen-Before-Talk procedures through the principles disclosed in this disclosure. Thus, while particular embodiments and applications have been illustrated and described, it is to be understood that the disclosed embodiments are not limited to the precise construction and components disclosed. Various modifications, changes and variations, which will be apparent to those of ordinary skill in the art, may be made in the disclosed arrangement, operation and details of the method, and apparatus without departing from the spirit and scope defined in the appended claims.

What is claimed is:

1. A method in a user equipment device (UE) supporting a set of radio frequency (RF) bands, the method comprising:
   receiving, at the UE from a base station of a network, a country code with which the network is associated;
   obtaining, by the UE, an indication of a physical location of the UE;
   reducing, by the UE, the set of RF bands supported by the UE based on the country code and the physical location of the UE to generate a reduced set of RF bands supported by the UE; and
   transmitting, by the UE, an advertisement of only the reduced set of RF bands supported by the UE.

2. The method of claim 1, wherein the reducing of the set of UE-supported RF bands includes accessing, by the UE, a list of the set of UE-supported RF bands stored at the UE, and determining, based on the list, the reduced set of UE-supported RF bands to be a subset of the set of UE-supported RF bands, the subset corresponding to the country code and the physical location of the UE.

3. The method of claim 2, wherein the determining, based on the list, of the reduced set of UE-supported RF bands includes at least one of:
   matching the country code and the physical location of the UE to one or more entries of the list;
   filtering the list based on the country code and the physical location of the UE to determine the one or more entries of the list; or
   determining the reduced set of RF bands to include one or more UE-supported RF bands included in an intersection of the one or more entries of the list and an entirety of the list.

4. The method of claim 1, wherein the transmitting of the advertisement of only the reduced set of RF bands supported by the UE includes transmitting a UE Capability Information Element (IE).

5. The method of claim 1, wherein the reducing of the set of UE-supported RF bands includes:
   accessing, by the UE, a band database storing an indication of RF bands that are available for each country code of a plurality of country codes; and
   determining, based on the accessing of the band database, a set of RF bands that are available for the country code received by the UE.

6. The method of claim 5, wherein the determining, based on the accessing, of the set of RF bands that are available for the country code received by the UE includes determining, based on the accessing, a set of RF bands that are available for both the country code received by the UE and the physical location obtained by the UE to be the reduced set of UE-supported RF bands.

7. The method of claim 5, wherein the accessing of the band database includes least one of:
   accessing a first instance of the band database stored at the UE; or
   transmitting, by the UE, a query to one or more computing devices storing a second instance of the band database.

8. The method of claim 7, further comprising:
   receiving, by the UE from the one or more computing devices storing the second instance of the band database, an indication of an update to the band database stored at the one or more computing devices; and
   applying the update to the first instance of the band database stored at the UE.

9. The method of claim 2, wherein the determining, based on the list, of the reduced set of UE-supported RF bands to be the subset of the set of UE-supported RF bands includes determining the reduced set of UE-supported RF bands to include one or more UE-supported RF bands included in an intersection of one or more entries of the list of the set of UE-supported RF bands that correspond to the country code obtained by the UE and a set of RF bands that are available for the country code obtained by the UE.

10. The method of claim 1, wherein the reducing of the set of UE-supported RF bands is further based on at least one of: an identification of a carrier corresponding to the network, or an indication of a set of RF bands that are utilized by the base station, and wherein the base station provides the at least one of the identification of the carrier or the indication of the set of RF bands utilized by the base station to the UE.

11. The method of claim 1, wherein the obtaining of the indication of the physical location of the UE includes obtaining location information from a geo-spatial positioning component of the UE.

12. The method of claim 1, wherein the obtaining of the indication of the physical location of the UE includes obtaining location information from the base station or from another base station of the network.

13. The method of claim 1, wherein the obtaining of the indication of the physical location of the UE includes obtaining at least one of:
   an indication of geographic or geospatial coordinates corresponding to the physical location of the UE;
   an indication of a zone in which the physical location of the UE is disposed;
   an indication of a city in which the UE is disposed; or
   an indication of an allocated region in which the UE is disposed.

14. The method of claim 1, wherein the transmitting of the advertisement of only the reduced set of UE-supported RF bands includes transmitting an advertisement of a band of spectrum supporting millimeter wave (mmWave) signals.

15. The method of claim 1, wherein the transmitting of the advertisement of only the reduced set of UE-supported RF bands includes transmitting an advertisement of a band of unlicensed spectrum.

16. The method of claim 1, wherein:
the base station is a first base station, the network is a first network, the physical location of the UE is a first physical location of the UE, and the reduced set of UE-supported RF bands is a first reduced set of UE-supported RF bands; and
the method further comprises, upon the UE moving to a second physical location:
obtaining, by the UE, an indication of the second physical location of the UE;
reducing, by the UE, the set of UE-supported RF bands based on at least one of a second country code or the second physical location of the UE to generate a second reduced set of UE-supported RF bands; and
transmitting, by the UE, an advertisement of only the second reduced set of UE-supported RF bands.

17. The method of claim 16, wherein the first network and the network associated with the second physical location of the UE are respectively associated with different country codes.

18. The method of claim 16, wherein the first network and the network associated with the second physical location of the UE are respectively associated with different carriers.

19. The method of claim 16, wherein the first network and the network associated with the second physical location of the UE are an integral network.

20. The UE of claim 1.

* * * * *